(12) United States Patent
Berduque et al.

(10) Patent No.: US 11,536,680 B2
(45) Date of Patent: Dec. 27, 2022

(54) ELECTROCHEMICAL SENSOR AND METHOD OF FORMING THEREOF

(71) Applicant: Analog Devices International Unlimited Company, Limerick (IE)

(72) Inventors: Alfonso Berduque, Crusheen (IE); Youri Victorovitch Ponomarev, Rotselaar (BE); Brendan Cawley, Patrickswell (IE); Donal McAuliffe, Raheen (IE); Raymond J. Speer, Dalkey (IE)

(73) Assignee: Analog Devices International Unlimited Company, Limerick (IE)

( * ) Notice: Subject to any disclaimer, the term of this patent is extended or adjusted under 35 U.S.C. 154(b) by 506 days.

(21) Appl. No.: 16/684,292

(22) Filed: Nov. 14, 2019

(65) Prior Publication Data
US 2021/0148850 A1    May 20, 2021

(51) Int. Cl.
*G01N 27/404* (2006.01)
*G01N 27/30* (2006.01)
(Continued)

(52) U.S. Cl.
CPC ......... *G01N 27/30* (2013.01); *G01N 27/4078* (2013.01); *G01N 27/327* (2013.01); *G01N 27/4045* (2013.01)

(58) Field of Classification Search
CPC ............. G01N 27/327; G01N 27/3272; G01N 27/404; G01N 27/4045; G01N 27/403
See application file for complete search history.

(56) References Cited

U.S. PATENT DOCUMENTS

| 4,132,616 A | 1/1979 | Tantram et al. |
| 4,406,770 A | 9/1983 | Chan et al. |

(Continued)

FOREIGN PATENT DOCUMENTS

| CH | 693969 A5 * | 5/2004 | ............. G01N 27/12 |
| DE | 102016003452 | 9/2017 | |

(Continued)

OTHER PUBLICATIONS

EPO computer-generated English language translation of the Description section of CH 693969 A1 patent published May 14, 2004, downloaded Apr. 28, 2022 (Year: 2004).*

(Continued)

*Primary Examiner* — Alexander S Noguerola
(74) *Attorney, Agent, or Firm* — Schwegman Lundberg & Woessner, P.A.

(57) ABSTRACT

Electrochemical sensors include a housing within which an electrolyte is provided over the electrodes. The housing includes an active region, which is the area around the electrodes in which the electrolyte must be positioned to ensure correct operation of the device. The inner walls, base and ceiling of the housing are coated in either hydrophobic or hydrophilic materials, or both, so as to encourage the electrolyte to take a position over the active region, which is defined by the position of the electrodes. In some electrochemical sensors, a combination of hydrophobic and hydrophilic materials is used and the materials can be arranged in a pattern, which encourages the electrolyte to take a position over the active region.

20 Claims, 15 Drawing Sheets

(51) Int. Cl.
*G01N 27/407* (2006.01)
*G01N 27/327* (2006.01)

(56) References Cited

U.S. PATENT DOCUMENTS

| | | | | |
|---|---|---|---|---|
| 4,562,725 | A * | 1/1986 | Oka | G01N 27/225 |
| | | | | 73/335.03 |
| 5,071,526 | A | 12/1991 | Pletcher et al. | |
| 5,126,035 | A | 6/1992 | Kiesele et al. | |
| 5,650,054 | A | 7/1997 | Shen et al. | |
| 6,200,443 | B1 | 3/2001 | Shen et al. | |
| 6,941,814 | B2 | 9/2005 | Hegner et al. | |
| 6,948,352 | B2 | 9/2005 | Rabbett et al. | |
| 7,073,368 | B2 | 7/2006 | Wood et al. | |
| 8,083,914 | B2 | 12/2011 | Millar et al. | |
| 9,964,511 | B2 | 5/2018 | Sommer et al. | |
| 10,302,627 | B2 | 5/2019 | Scheffler et al. | |
| 2005/0145494 | A1 | 7/2005 | Inoue et al. | |
| 2006/0120924 | A1 | 6/2006 | Inoue et al. | |
| 2009/0057150 | A1* | 3/2009 | Millar | G01N 27/404 |
| | | | | 204/432 |
| 2013/0197332 | A1 | 8/2013 | Lucisano et al. | |
| 2016/0178565 | A1 | 6/2016 | Chapples et al. | |
| 2017/0052145 | A1 | 2/2017 | Westmarland et al. | |
| 2018/0059044 | A1* | 3/2018 | Berduque | G01N 27/4045 |
| 2018/0266984 | A1* | 9/2018 | Pratt | G01N 27/4071 |
| 2019/0219536 | A1* | 7/2019 | Porsgaard | G01N 27/4045 |
| 2019/0317042 | A1* | 10/2019 | Mu | G01N 27/404 |

FOREIGN PATENT DOCUMENTS

| | | |
|---|---|---|
| JP | 2004117307 | 4/2004 |
| JP | 5276604 | 5/2013 |

OTHER PUBLICATIONS

Kiradjiev et al., "A Simple Model for the Hygroscopy of Sulfuric Acid," Ind. Eng. Chem. Res. 59, 4902-4808 (Year: 2020).*
Chou, Jack, "Ch. 2: Electrochemical Sensors", Hazardous Gas Monitors: A Practical Guide to Selection, Operation and Applications; International Sensor Technology, (1999), 27-35.
Korotcenkov, Ghenadii, "Review of Electrochemical Hydrogen Sensors", Chemical Reviews, 109(3), (2009), 1402-1433.

* cited by examiner

ELECTROCHEMICAL SENSOR AND METHOD OF FORMING THEREOF

FIELD OF THE DISCLOSURE

The present disclosure relates to an electrochemical sensor having a hydrophobic and/or hydrophilic layer. The present disclosure also relates to a method of forming such an electrochemical sensor having a hydrophobic and/or hydrophilic layer.

BACKGROUND

Electrochemical gas sensors can include a substrate upon which two or more electrodes and an electrolyte reside. An example of such a sensor is disclosed in the applicant's co-pending application U.S. Ser. No. 15/251,833 which is incorporated herein by reference. The electrodes or the electrolyte are exposed to the natural environment by one or more holes or pores provided in a portion of the housing. For example, a plurality of capillaries may be provided in a substrate upon which the electrodes and electrolyte are formed. When certain gases enter the device via the openings, an electrochemical reaction occurs which may be sensed by connections to the electrodes.

SUMMARY OF THE DISCLOSURE

Electrochemical sensors include a housing within which an electrolyte is provided over the electrodes. The housing includes an active region, which is the area around the electrodes in which the electrolyte must be positioned to ensure correct operation of the electrochemical sensor (hereinafter also referred to as the "device"). The inner walls, base and ceiling of the housing are coated in either hydrophobic or hydrophilic materials, or both, so as to encourage the electrolyte to take a position over the active region, which is defined by the position of the electrodes. In some electrochemical sensors, a combination of hydrophobic and hydrophilic materials is used and the materials can be arranged in a pattern, which encourages the electrolyte to take a position over the active region.

In accordance with a first aspect of the disclosure, there is provided an electrochemical sensor, comprising a housing; two or more electrodes formed within the housing and defining an active region; an electrolyte formed within the housing; and at least one of a hydrophobic or a hydrophilic material arranged within the housing so as to encourage the electrolyte to be positioned over the active region.

By "active region", it is meant an area around the electrodes in which the electrolyte must be positioned to ensure correct operation of the device. In the electrochemical sensor, when a gas diffuses in and contacts the electrode-electrolyte interface, an oxidation reaction occurs that results in current flowing from the working electrode to the counter electrode, and a reduction reaction occurs that results in current flowing from the counter electrode to the working electrode. Therefore, in order for the device to operate efficiently, the electrolyte should be positioned to cover an area that at least connects the electrodes. Thus, the active region is defined by the position of the two or more electrodes.

By "over", it will be appreciated that this refers to the orientation of the electrochemical sensor as show in the figures, rather than the orientation of the electrochemical sensor in use.

The "housing" refers to the electrolyte housing. It may include a cap of the electrochemical sensor. It may further include part of the substrate. Together, a combination of the cap and the substrate can encapsulate the electrolyte entirely, and the arrangement of hydrophobic and/or hydrophilic material can be on the inner surface of the cap and/or on the upper surface of the substrate, thus preventing electrolyte from escaping.

By "encourage to be positioned", it is meant that the electrolyte is caused to move away from the hydrophobic material and towards the hydrophilic material by virtue of the arrangement of the hydrophobic and/or hydrophilic material within the housing. For example, the hydrophobic and/or hydrophilic material may be patterned in a way so as to cause movement of the electrolyte to be repelled away from the hydrophobic material and attracted towards the hydrophilic material in the case that the electrolyte is an aqueous hydrophilic electrolyte. If, alternatively, the electrolyte is a non-aqueous hydrophobic electrolyte, then the hydrophobic and/or hydrophilic material may be patterned in a way so as to cause movement of the electrolyte to be repelled away from the hydrophilic material and attracted towards the hydrophobic material.

The electrochemical sensor may further comprise one or more of the following: a substrate and a passivation layer.

The housing may comprise a substrate, having a plurality of layers, and a cap; the two or more electrodes may be formed over a first portion of the substrate; and the hydrophobic material may comprise a hydrophobic layer arranged over a second portion of the substrate surrounding the two or more electrodes.

The two or more electrodes can be formed over the substrate of the electrochemical sensor and positioned towards the centre of the substrate. The hydrophobic layer may comprise an opening aligned with the electrodes. The two or more electrodes can be circular in shape or ring shaped in some examples.

The housing comprises a substrate, having a plurality of layers, and a cap; the two or more electrodes may be formed over a first portion of the substrate; and the hydrophilic material may comprises a hydrophilic layer arranged at least partially over, or adjacent to, the at least two electrodes. The two or more electrodes may be positioned towards the centre of the substrate, the hydrophobic layer may comprise an opening aligned with the electrodes, and the hydrophilic layer may be arranged within the opening.

The above and following arrangements of hydrophobic and/or hydrophilic layers are particularly advantageous for an aqueous hydrophilic electrolyte. This may be a water-based electrolyte such as sulphuric acid.

The hydrophobic material may comprise a hydrophobic layer that is arranged on the inner surface of the cap of the electrochemical sensor so as to repel electrolyte from the inner surface of the cap. It could be also arranged over the substrate and/or over a passivation layer of the electrochemical sensor. It can be arranged to cover an area of substrate surrounding the two or more electrodes, wherein the hydrophobic layer comprises an opening aligned with the electrodes. Alternatively or additionally, the hydrophobic layer can be arranged around the periphery of at least one electrode so as to cause the electrolyte to be positioned over the at least one electrode.

The hydrophilic material may comprise a hydrophilic layer that is arranged over a substrate and/or passivation layer of the electrochemical sensor.

The hydrophilic layer could also be arranged over at least one electrode of the electrochemical sensor, which defines the active region, so as to cause electrolyte to be positioned over the at least one electrode. In other examples, the hydrophilic layer can be arranged over two or more electrodes. The hydrophilic layer may have a ring shaped pattern, the at least one electrode may also be ring shaped and the ring shaped hydrophilic layer and the ring shaped electrode can be arranged to be coterminous. In some examples, the hydrophilic material may comprise two ring shaped hydrophilic layers arranged concentrically, and in this case, the hydrophilic layers can be arranged over an area of substrate in areas adjacent the two or more electrodes, which may also be ring shaped.

In one example, the electrochemical sensor may comprise both a hydrophobic layer and a hydrophilic layer, the hydrophilic layer being arranged in closer proximity to the at least two electrodes than the hydrophobic layer. For example, the hydrophobic layer can be arranged over a substrate of the electrochemical sensor and the hydrophobic layer can be arranged surrounding the hydrophilic layer. In some examples, the hydrophobic layer and the hydrophilic layer can be coterminous.

The following arrangements are particularly advantageous for a non-aqueous hydrophobic electrolyte. This may be an organic-based electrolyte.

The hydrophilic material may comprise a hydrophobic layer arranged on the inner surface of a cap or over a substrate of the electrochemical sensor surrounding the two or more electrodes, and/or the hydrophobic material comprises a hydrophobic layer arranged over at least one electrode of the electrochemical sensor.

In general, the hydrophobic or hydrophilic material arranged within the housing has the advantageous effect of keeping the active region of the electrochemical sensor wet with electrolyte. Therefore, the electrolyte remains correctly positioned within the device and so the device can continue to operate efficiently throughout its lifetime.

Another effect of the hydrophobic or hydrophilic material may be, by maintaining the position of the electrolyte over the active region, to also prevent or slow down electrolyte from drying out or escaping the device. In other words, the hydrophobic or hydrophilic material may also help to minimise the risks of electrolyte leakage.

In accordance with a second aspect of the disclosure, there is a provided a gas sensor package, comprising: a substrate; two or more electrodes formed over the substrate; a cap; and an electrolyte, wherein the electrolyte is held within the gas sensor package, in use, in a space encapsulated by the substrate and the cap, and wherein the electrolyte is held over an active sensing region of the electrodes by at least a one of a hydrophobic or a hydrophilic material.

As with the first aspect, by "active sensing region", it is meant an area over the electrodes in which the electrolyte must be positioned to ensure correct operation of the device. This would usually be in a space encapsulated by the substrate and the cap. The electrolyte is therefore maintained in contact with the electrodes and also prevented or restricted from leaving this space by the hydrophobic or hydrophilic material.

In accordance with a third aspect of the disclosure, there is provided a method of manufacturing an electrochemical sensor, the method comprising: providing a housing; forming two or more electrodes within the housing so as to define an active region; forming an electrolyte over the two or more electrodes; and forming at least a hydrophobic or a hydrophilic material within the housing so as to encourage the electrolyte to be positioned over the active region.

Again, as with the first and second aspects, by forming a hydrophobic or hydrophilic material within the housing in certain arrangements, the electrolyte can be encouraged to be positioned over the "active region", which is defined by the position of the two or more electrodes.

In the method of manufacturing an electrochemical sensor, the step of forming the hydrophobic or hydrophilic material may comprise one or more of the following steps:
  forming a hydrophobic layer and/or a hydrophilic layer on the inner surface of a cap of the electrochemical sensor;
  forming a hydrophobic layer and/or a hydrophilic layer over a substrate of the electrochemical sensor surrounding the two or more electrodes;
  forming a hydrophobic layer and/or a hydrophilic layer arranged over at least one electrode of the electrochemical sensor;
  forming a hydrophobic layer surrounding a hydrophilic layer or a hydrophilic layer surrounding a hydrophobic layer;
  patterning the at least one of a hydrophobic or a hydrophilic material so as to cause the electrolyte to move away from the hydrophobic material and/or towards the hydrophilic material; and
  patterning the at least one of a hydrophobic or a hydrophilic material so as to cause the electrolyte to move away from the hydrophilic material and/or towards the hydrophobic material.

In each of the above examples, advantages associated with one aspect of the disclosure may also be associated with another aspect of the disclosure if appropriate.

BRIEF DESCRIPTION OF THE DRAWINGS

Examples of the present disclosure will now be described, by non-limiting example only, with reference to the accompanying drawings, in which.

DETAILED DESCRIPTION

During manufacture, an electrochemical sensor may be filled with a suitable electrolyte. The electrolyte sits over the electrodes in the sensor's active region. Over time, the electrolyte may dry out or escape via the openings in the device. As the electrolyte shrinks, it may recede from the active region of the sensor, causing the sensor to operate ineffectively, or not at all.

In the present disclosure, the position of the electrolyte within the housing of the sensor is influenced by using an arrangement of hydrophobic and/or hydrophilic materials. The arrangement of hydrophobic and/or hydrophilic materials may also result in preventing or restricting the electrolyte from drying out or escaping the sensor. Therefore, the sensors/devices are much more stable over their working life.

A hydrophobic material is one that repels water, for example, SU8 or polytetrafluoroethylene (PTFE). A hydrophobic material may be provided as a coating by itself or as a hydrophobic surface of another material. A hydrophilic material is one that attracts water, for example, silicon dioxide or a porous hydrophilic polymer. A hydrophilic material may be provided as a coating by itself or a hydrophilic surface or another material. By arranging the hydrophobic and/or hydrophilic materials in certain configurations, is it possible to manipulate the position of the electrolyte over the "active region", which is defined above.

In electrochemical sensors which are manufactured using micromachining techniques, or which are within an integrated circuit, and which are reduced in size compared with discrete sensors, the hydrophobic and/or hydrophilic materials may also be applied using thin film deposition techniques, or may also be applied by stencil or screen-printing, spin coating, etc.

The electrochemical sensor may have two or more electrodes. Typically, at least two electrodes are provided; a working electrode and a counter electrode. The potential difference, current flow or resistance between these electrodes may be measured in order to determine whether a gas has entered through openings in the substrate of the device. Sometimes, a third electrode, known as a reference electrode, is also provided. The reference electrode is held at a constant potential with respect to the working electrode. The presence of substances which interact with the working electrode/electrolyte interface can invoke current flow between the working electrode and the counter electrode as a result of reduction/oxidation reactions at the working electrode. Additional electrodes such as a diagnostics electrode and/or a second working electrode, etc. may also be incorporated.

Figure 1A:
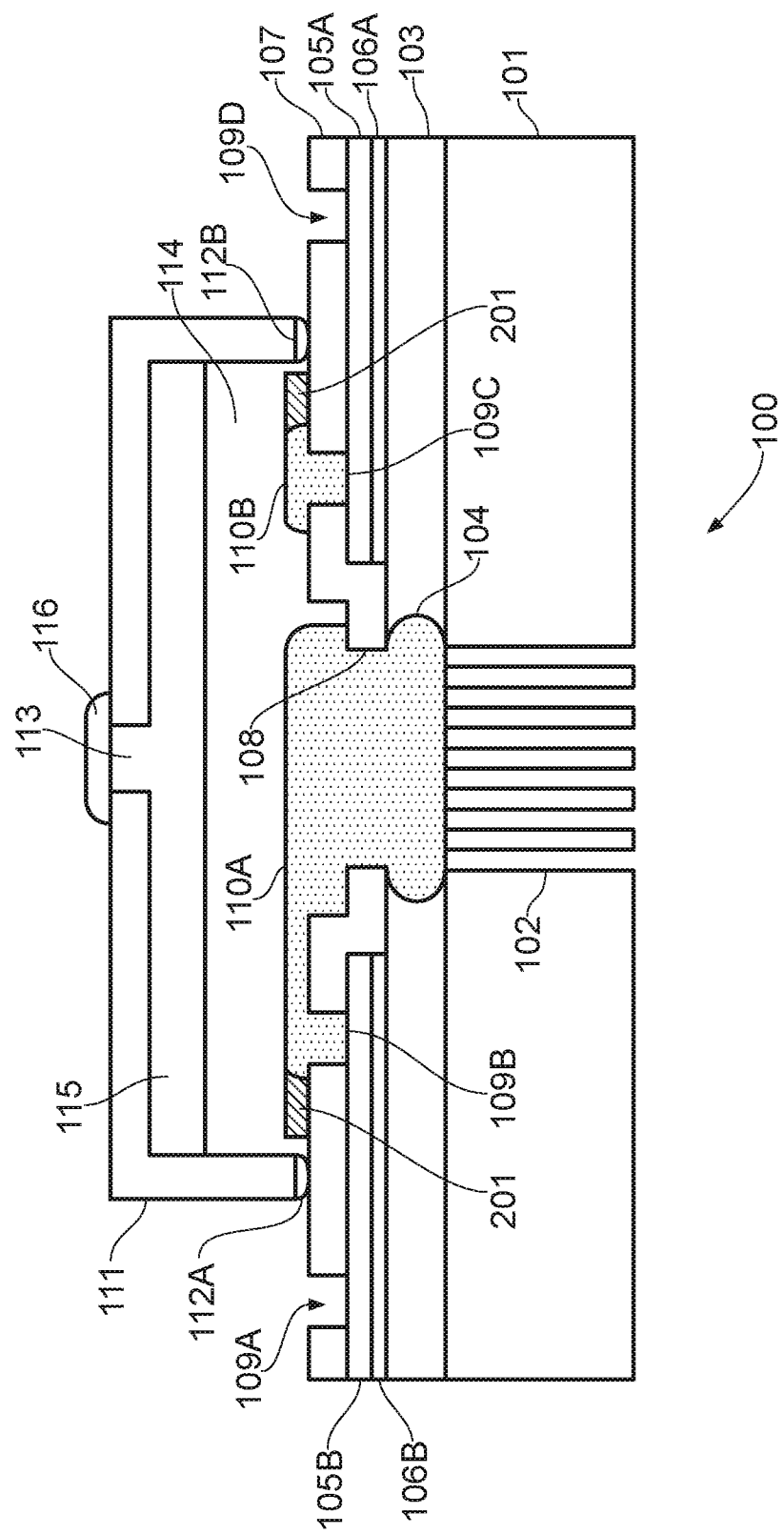
FIG. 1A is a cross-sectional view of an electrochemical sensor in accordance with a first example of the disclosure.

FIG. 1A shows a cross-section through an electrochemical sensor 100 formed on silicon using micromachining techniques in accordance with a first example of the disclosure. An example of such a sensor is disclosed in the applicant's co-pending application U.S. Ser. No. 15/251,833 which is incorporated herein by reference. The electrochemical sensor is formed on a silicon substrate 101. In this example, a single sensor is formed on the silicon substrate 101. However, in practice, several sensors may be formed on a single substrate, in a similar manner to the way in which multiple integrated circuits may be formed on a single silicon substrate. As an alternative to silicon, the substrate may be made from glass, ceramic or plastic. A plurality of microcapillaries 102 are formed in the substrate 101. In FIG. 1A, six microcapillaries are shown in cross-section. However, the microcapillaries 102 are also formed across the width of the substrate, and there may be typically ten or more microcapillaries, or a single microcapillary. Each microcapillary is formed in a direction orthogonal to the surface of the substrate 101, and extends from an upper surface to a lower surface of the substrate. Each microcapillary is approximately 20 µm in diameter, although each microcapillary may be in the range of 1 µm to 2 mm in diameter. The group of microcapillaries 102 is approximately 1 mm across, but may be in the range of 0.001 mm to 3 mm across.

An insulating layer 103 is formed on the upper surface of the substrate 101. The insulating layer 103 may be formed from silicon oxide ($SiO_2$) and is approximately 4 µm thick. An electrode opening 104 is formed in the insulating layer 103 in a position that is aligned with the microcapillaries 102. The opening is described as being aligned in the sense that the microcapillaries are formed in an area defined by the opening in the insulating layer. The walls of the opening 104 are not necessarily precisely aligned with the walls of the microcapillaries. In this example, the opening 104 is approximately circular, but may be square or rectangular. The opening 104 may be 1 to 2 mm across. The side walls of the opening 104 are straight in shape. However, it will be appreciated that the side walls may be semi-circular or may be formed from any other shape that increases the surface area of the side walls.

Conductive tracks 105A, 105B are formed on a top surface of the insulating layer 103. The conductive tracks 105A, 105B are adhered to the insulating layer 103 by an adhesion layer 106A, 106B. The conductive tracks 105A, 105B may be made of gold or any other suitable conductive material. For example, the conductive tracks may be made from metal or conductive plastic. The conductive tracks are arranged such that they stop approximately 25 µm from the edge of the opening 104. The tracks may stop anywhere between a few microns to a few millimeters from the edge of the opening. The conductive tracks 105A, 105B are for connecting the electrodes to external circuit elements. The conductive tracks may extend into the opening formed in the insulating layer 103. Additionally the conductive tracks may extend into the capillaries in order to improve contact resistance.

A passivation layer 107 is formed over the insulating layer 103 and the conductive tracks 105A, 105B. An opening 108 is formed in the passivation layer 107. The opening 108 is the same size as the electrode opening 104, and is aligned with the opening 104. Additional holes 109A, 109B, 109C, 109D are formed in the passivation layer to allow connections to be made between the electrodes (discussed below) and external circuit elements. Additional holes may be added for sensors with more than two electrodes.

As FIG. 1A shows a cross-section through the sensor 100, only a working electrode 110A and a counter electrode 110B are shown. The working electrode 110A is formed in the openings 104 and 108. The electrode completely fills the openings 104 and 108 and abuts the top surface of the substrate 101.

The working electrode 110A extends approximately 25 µm above the top of the passivation layer 107. The working electrode 110A also extends into hole 109B. This provides an electrical connection to conductive track 105B, allowing connections to external circuit elements via hole 109A. A counter electrode 110B is formed in hole 109C. Counter electrode 110B also extends 25 µm above the passivation layer 107. The counter electrode 110B also extends into hole 109C. This provides an electrical connection to conductive track 105A, allowing connections to external circuit elements via hole 109D. The electrode 110A is printed directly on the microcapillaries 102. As such, the electrolyte 114 may be liquid. The electrode 110A prevents the electrolyte 114 passing through the microcapillaries. The electrodes are porous and are made of a catalyst, such as platinum. The electrode 110A thus provides the 3-phase porous surface required for the chemical reactions to take place. The catalyst is a medium to high surface area porous catalyst, such as platinum black. Sufficient catalyst is provided to ensure sufficient catalytic activity throughout the sensor's lifetime. The catalyst may also be one of platinum, gold, ruthenium, carbon black or iridium. Other appropriate materials may be used.

A cap 111 is formed over the electrodes 110A, 110B. In embodiments where additional electrodes are used, the cap 111 would also be formed over those electrodes. The cap may be formed from glass, ceramic, silicon or plastic. The cap 111 is sealed to the passivation layer 107 by epoxy/adhesive or frit glass 112A, 112B. Other bonding techniques may be used. A hole 113 is formed in the top of the cap 111. An electrolyte 114 is provided within the cap 111. In another aspect, two or more holes may be formed in the cap 111. This would enable the electrolyte to be vacuum filled. The electrolyte 114 may be made from a liquid solution, such as a conductive aqueous electrolyte or organic electrolyte, a conductive polymer, such as Nafion or PEDOT:PSS. The electrolyte may also be a hydrogel or a room temperature ionic liquid. In one example, the electrolyte may be sulfuric acid solution and may include a wicking material or wicking substructure. The electrolyte may be a two-layer electrolyte. The electrolyte 114 completely covers the electrodes, but when using liquid electrolytes, does not completely fill the cap 112. Instead, a void space 115 is left towards the top of the cap 111. The void space 115 may not be required when using conductive polymer electrolytes, hydrogels and some other non-aqueous electrolytes. Epoxy glue or a sealing tape 116 (or any other organic polymeric material) is formed over the hole or holes 113 to prevent or restrict any pollutants entering the cap, and also to prevent or restrict the electrolyte 114 from leaving the cap. Other options may be utilized for sealing. If two holes are provided in the cap 111, a seal may be formed over both holes. In another aspect, a larger hole could be covered with an adhered lid, once the cavity is filled.

If the cap 111 is made from plastic, the plastic material must be compatible with the electrolyte 114. Various plastic materials may be used. For example, the cap may be made from acrylonitrile butadiene styrene (ABS), PTFE, polycarbonate (PC), polyethylene (PE), polydimethylsiloxane (PDMS), amongst other plastics. Important properties of the plastic are its chemical resistance and its compatibility with the electrolytes.

A hydrophobic layer 201 is deposited on the passivation layer 107 in an arrangement that surrounds the electrodes 110A, 110B. The hydrophobic layer is arranged around the periphery of the electrodes 110A, 110B and has an opening aligned with the electrodes. Therefore, when the electrochemical sensor 100 is filled with a liquid electrolyte 114, the liquid electrolyte is repelled by the hydrophobic layer 201 and encouraged to remain around the vicinity of the electrodes 110A, 110B rather than seeping towards the edges of where the cap 111 is sealed to the passivation layer 107. The hydrophobic layer 201 has the advantageous effect of keeping the active region of the electrochemical sensor wet with electrolyte. Therefore, the electrolyte remains correctly positioned within the device and so the device can continue to operate efficiently throughout its lifetime. This layer may be SU8 or another hydrophobic layer with chemical compatibility with the electrolyte, and it may be deposited applying conventional semiconductor manufacturing processes, or by other means such as screen or stencil printing, inkjet printing, spin-coating, etc.

It should be appreciated that the position of the electrolyte 114 shown in FIG. 1A is indicative of where it would sit when the hydrophobic layer 201 is not present. Examples showing how the position of the electrolyte 114 would be influenced by the presence of a hydrophobic and/or hydrophilic material are given in FIGS. 3, 5, 6A and 7A, which will be described in detail below.

It should also be appreciated that, depending on the sensor design, if the cavity height is small enough, then there is a 'surface tension' effect that can position the electrolyte differently, as disclosed in the applicant's co-pending application U.S. Ser. No. 15/888,863 which is incorporated herein by reference. For example, this effect may take place when the cavity height is at least below ~400 um height.

In FIG. 1A, the conductive tracks 105A, 105B are provided over the insulating layer 103. The openings 109A, 109D are provided outside of the cap 111 in order to allow the sensor to be connected to external devices. It may be preferable to omit the portion of the substrate 101 and insulting layer 103 that extend outside of the cap 111, in order to reduce the size of the sensor 100. In order to facilitate this, the conductive tracks may be omitted, and conductive vias may be formed through the substrate instead. This would enable connections to be made on the underside of the substrate 101. Additionally, the size of the substrate 101 may be reduced to the size of the cap 111.

The microcapillaries 102 may be lined with an insulating material. The purpose of this would be to electrically insulate the silicon substrate 101 from the electrodes.

Figure 1B:
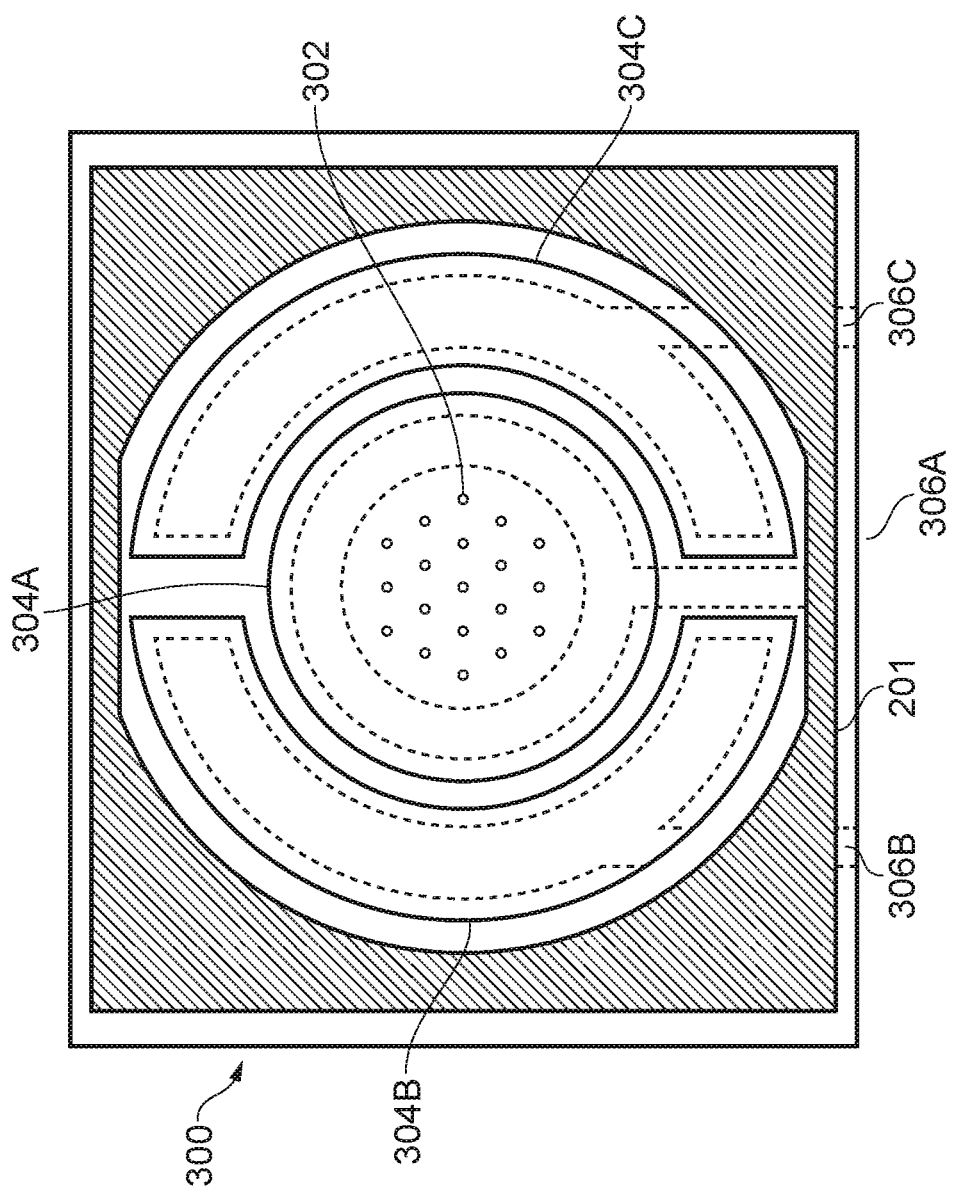
FIG. 1B is a plan view of an electrochemical sensor in accordance with another example of the disclosure.

FIG. 1B shows a plan view of an example sensor 300 with the cap 111 and the electrolyte 114 removed for clarity. The configuration of the sensor conductive tracks and electrodes in FIG. 1B slightly differs from that shown in FIG. 1A their shape and arrangement relative to the other sensor components. In FIG. 1B, the sensor 100 also includes conductive tracks 306A, 306B and 306C. The conductive tracks are shown in broken lines, as they are all positioned below the passivation layer. Conductive track 306A is for connecting the working electrode 304A. The conductive track includes a ring-shaped portion, which is located around the capillaries 302, but within the outer edge of the working electrode 304A. The ring-shaped portion is co-axial with the working electrode 304A. A ring-shaped opening is formed in the passivation layer, and is aligned with the ring-shaped portion of the conductive track 306A, in order to allow the working electrode 304A to connect to the conductive track 306A. A rectangular connecting portion of track 306A is formed at the bottom edge of the ring-shaped portion, to provide a connection to external circuitry.

Conductive tracks 306B and 306C are formed partially underneath counter electrode 304B and reference electrode 304C respectively. Each track includes a semi-annular portion which is the same shape as the corresponding electrode, but slight smaller in size. As such, the semi-annular portions fit within the perimeters of their respective electrodes. Openings are provided in the passivation layer to enable the conductive tracks 306B and 306C to connect to the working electrode 304B and reference electrode, respectively. These openings are similar in size and shape to the semi-annular portions of the conductive tracks 306B and 306C. In a similar manner to the conductive track 306A, the conductive tracks 306B and 306C include rectangular portions which extend from an outer edge of the semi-annular portions to provide connections to external circuitry.

The purpose of using a circular and semi-annular arrangement is to reduce and optimise the distance and spacing between the electrodes. This reduces the resistance path between the electrodes, which can affect the sensor performance, including speed of response. For example, in a carbon monoxide sensor, there's ion movement, or transport, between the electrodes in the sensor. Ideally, therefore, the electrodes (including the entire electrode area) should be as close together as possible. Using circular and semi-annular electrodes makes this easier to achieve.

In FIG. 1B, the hydrophobic layer 201 can be seen to surround the electrodes 304A, 304B, 304C. As mentioned above, when the electrochemical sensor is filled with a liquid electrolyte, the liquid electrolyte is encouraged to remain around the vicinity of the electrodes rather than seeping towards the edges of where the cap would be sealed to the passivation layer. The hydrophobic layer 201 has the advantageous effect of keeping the active region of the electrochemical sensor wet with electrolyte. Therefore, the electrolyte remains correctly positioned within the device and so the device can continue to operate efficiently throughout its lifetime.

FIG. 1B shows a sensor with components that have particular relative dimensions. These dimensions may be altered. The length and width of each sensor may be in the range of 1 mm to 10 mm. The overall thickness, including the substrate 101 and the cap 111 may be 1 mm. As such, on a typical 200 mm wafer, in excess of 1000 sensors may be produced.

In use, the sensor would be connected to a micro-controlled measurement system in a manner familiar to those skilled in the art. The sensor output may be continuously monitored and used to determine the concentration of analyte in the environment. The electrode 110A may come into contact with environmental gases via the microcapillaries 102. As the electrode 110A is porous, the environmental gases are able to pass through the electrode to a point where they come into contact with the electrolyte 114. A three-phase junction is therefore formed within the electrode. An advantage of using a printed, solid electrode 110A, is that it prevents or restricts the electrolyte 114 from escaping through the microcapillaries 102 in the substrate 101.

An advantage of the above-described structure is that silicon micromachining techniques can be used in its construction. As such, manufacturing of the sensor is compatible with fabrication techniques used to manufacture integrated circuits. By manufacturing multiple sensors in parallel, variations in the parameters of the sensors are reduced.

A further advantage of using silicon fabrication techniques is that the cost of each device is reduced. This is because each process step is applied to multiple sensors in parallel, so the processing cost per device is small. Additionally, micromachining techniques enable very small devices to be produced. As such, the sensors may be more easily incorporated into handheld devices. Furthermore, the sensors all see the same processing steps at the same time. As such, matching between devices is very good when compared with serially produced devices.

FIGS. 2A-7B show alternative examples of the disclosure to FIGS. 1A and 1B. In FIGS. 2A-7B, like components with FIGS. 1A and 1B are labelled with like reference numerals. Technical effects and advantages associated with like components of FIGS. 1A and 1B may therefore also apply to FIGS. 2A-7B.

Figure 2A:
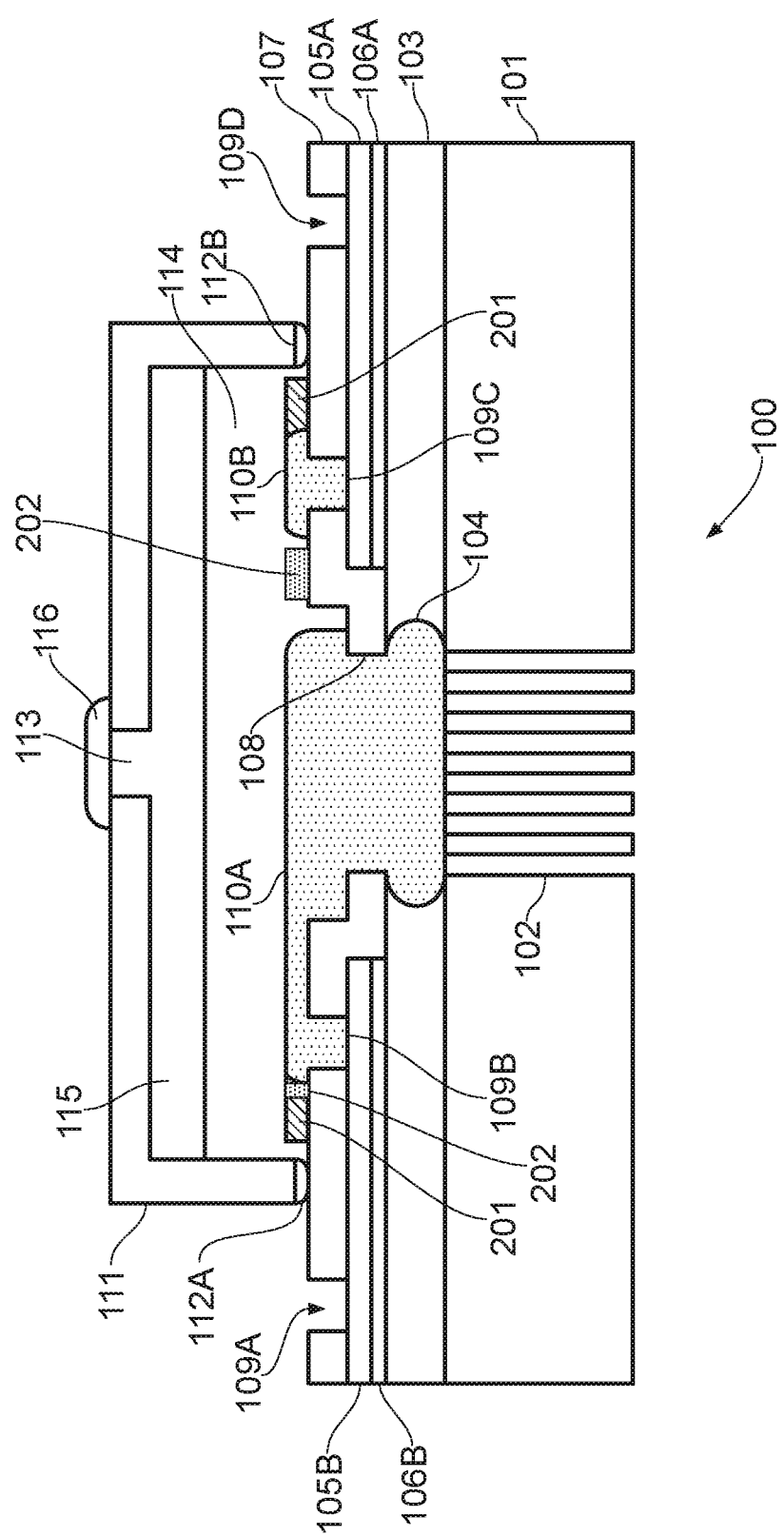
FIG. 2A is a cross-sectional view of an electrochemical sensor in accordance with a second example of the disclosure.

FIG. 2A shows a cross-section through an electrochemical sensor 100 formed on silicon using micromachining techniques in accordance with a second example of the disclosure. In this example, in addition to the hydrophobic layer 201 shown in FIG. 1A, a hydrophilic layer 202 is also provided on the upper surface of the passivation layer 107. The hydrophilic layer 202 attracts electrolyte 114 and therefore enhances the effect of the hydrophobic layer 201 by encouraging the electrolyte to stay nearby instead of towards the edges of where the cap 111 is sealed to the passivation layer 107.

Figure 2B:
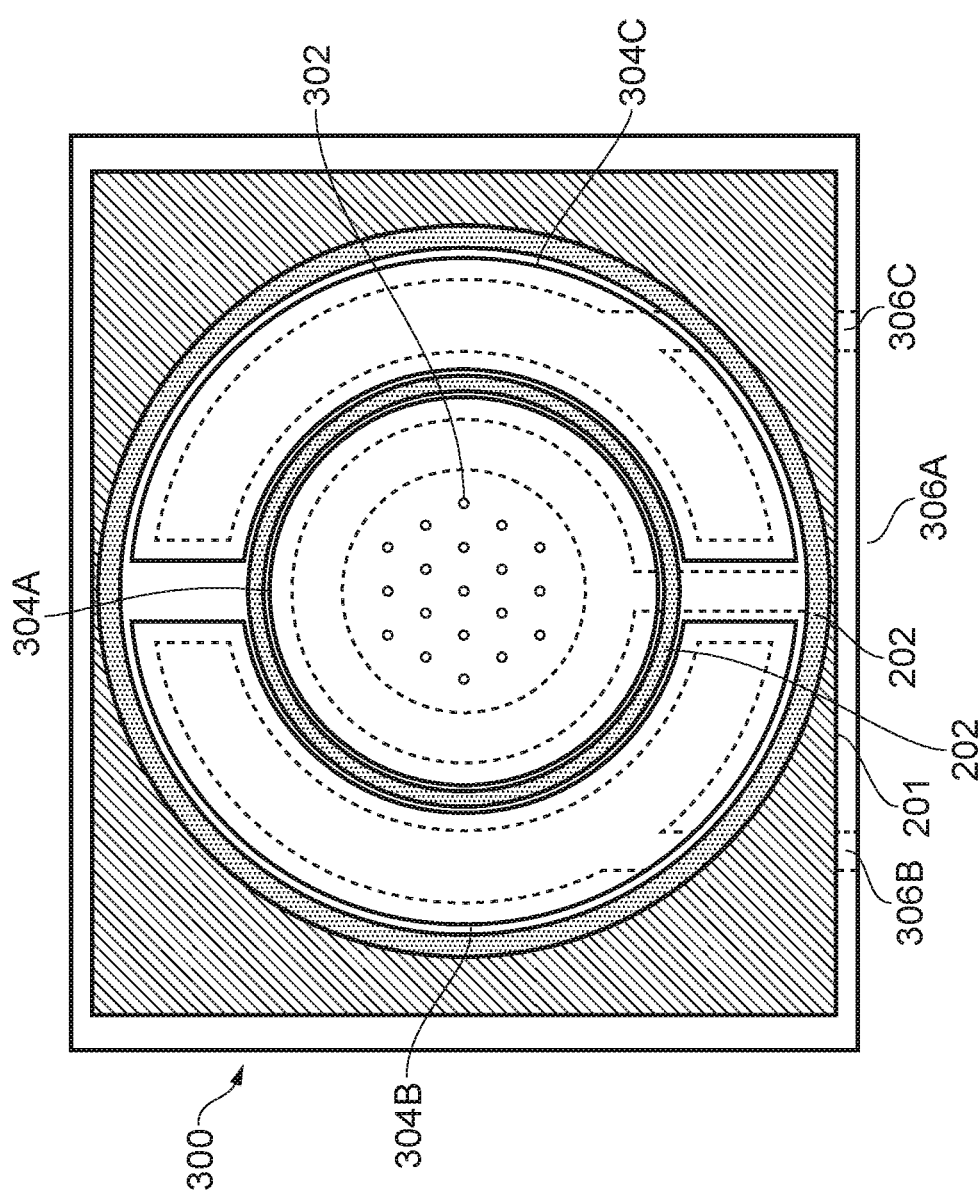
FIG. 2B is a plan view of an electrochemical sensor in accordance with another example of the disclosure.

FIG. 2B shows a plan view of an example sensor 300 with the cap 111 and the electrolyte 114 removed for clarity. In this example, relative to FIG. 1B, in addition to the hydrophobic layer 201, a hydrophilic layer 202 is also shown, and it is surrounded by the hydrophobic layer 201. Thus, the hydrophilic layer 202 forms two concentric rings which attract the electrolyte 114, and encourages the electrolyte 114 to sit in the vicinity of said ring.

Since the hydrophilic layers 202 and the electrodes are ring shaped, they are coterminous in the examples of FIG. 2B. The hydrophobic layer 201 surround the outer ring hydrophilic layer 202 and said outer ring layer 202 are also coterminous. The hydrophilic layer 202 is arranged in closer proximity to the electrodes than the hydrophobic layer 201 so as to attract electrolyte away from the hydrophobic layer 201 and towards the hydrophilic layers 202 such that it is positioned above the active region, as defined by the electrodes.

Figure 3:
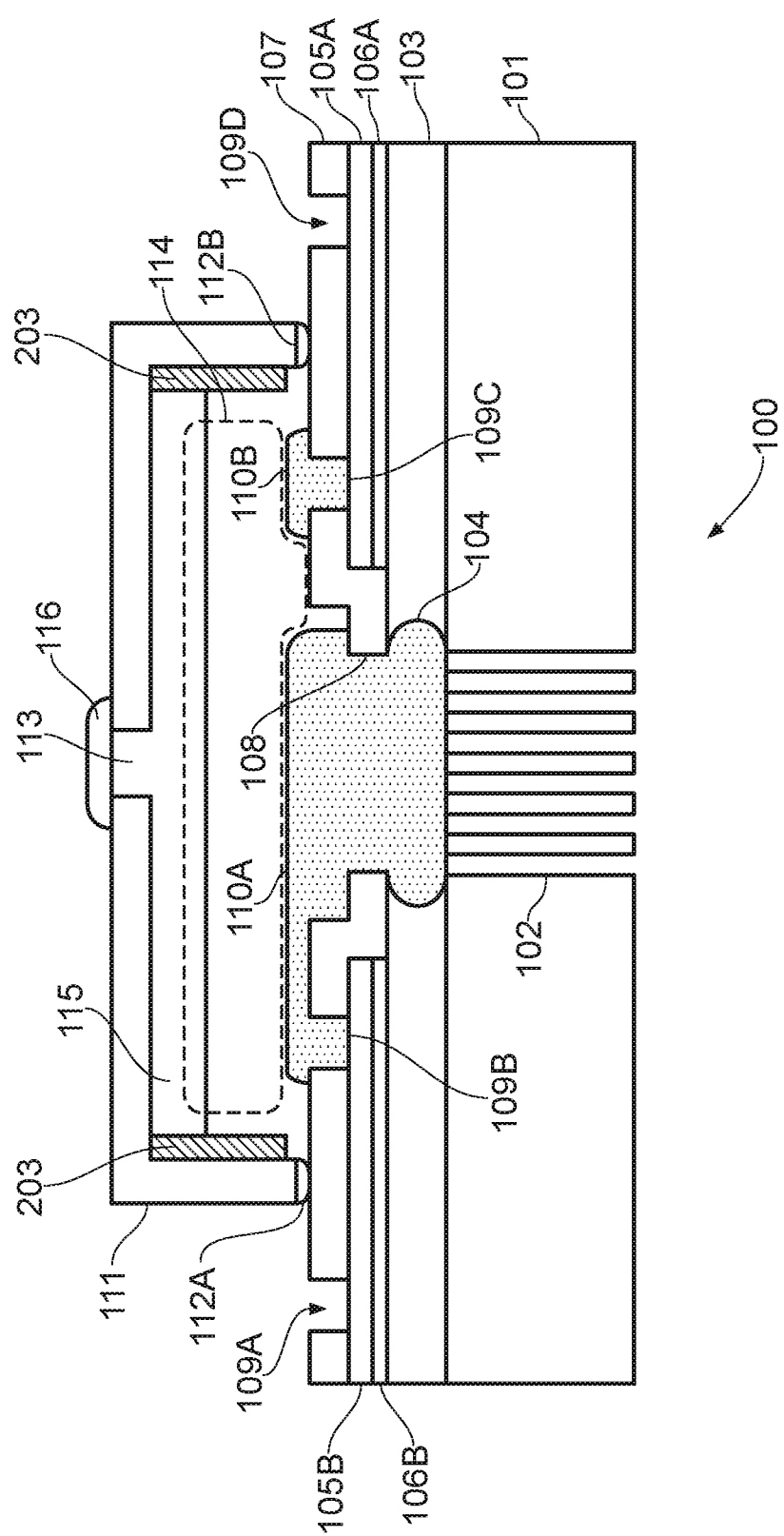
FIG. 3 is a cross-sectional view of an electrochemical sensor in accordance with a third example of the disclosure.

FIG. 3 shows a cross-section through an electrochemical sensor 100 formed on silicon using micromachining techniques in accordance with a third example of the disclosure. A hydrophobic layer 203 is deposited as a coating on the four inner side walls of the cap 111. It repels electrolyte 114 from the side walls of the cap 111, thus encouraging the electrolyte to remain over the active region above the electrodes 110A, 110B. The electrolyte 114 is shown in two positions, the first position (shown in solid lines) being how it would sit without the hydrophobic material and the second position (shown in dashed lines) being how it would sit with the hydrophobic materials applied to the inner surface of the cap 111. One, two or three of the inner side walls may be coated instead of all four side walls in alternative examples. The hydrophobic layer 203 is preferably deposited before the cap is adhered to the passivation layer 107 of the device.

Figure 4:
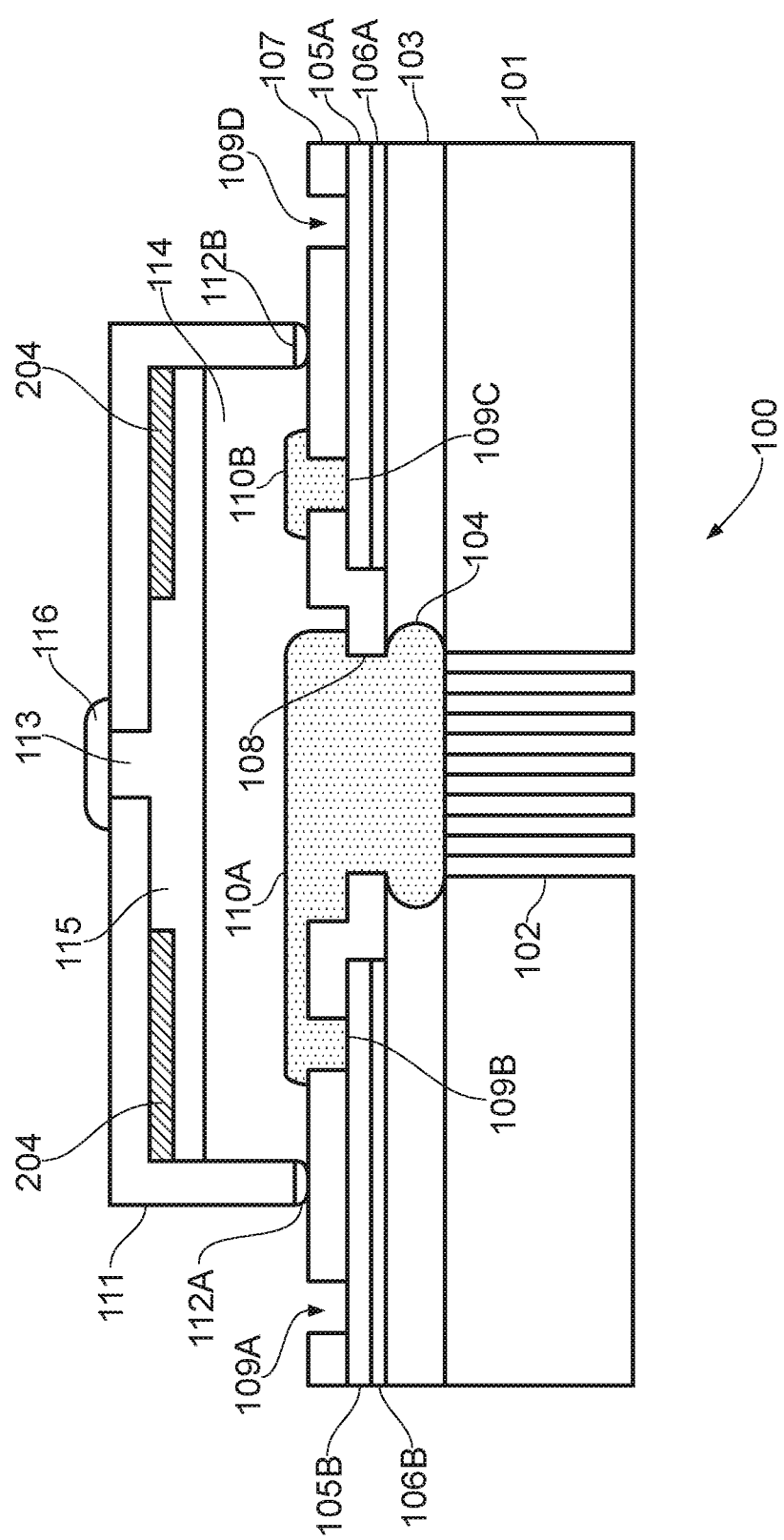
FIG. 4 is a cross-sectional view of an electrochemical sensor in accordance with a fourth example of the disclosure.

FIG. 4 shows a cross-section through an electrochemical sensor 100 formed on silicon using micromachining techniques in accordance with a fourth example of the disclosure. A hydrophobic layer 204 is deposited as a coating on the upper inner surface of the cap 111. It repels electrolyte 114 from the upper inner surface the cap 111, thus encouraging the electrolyte to remain over the active region above the electrodes 110A, 110B. All or some of the upper surface of the cap 111 may be coated. The hydrophobic layer 204 is preferably deposited before the cap is adhered to the passivation layer 107 of the device.

Figure 5:
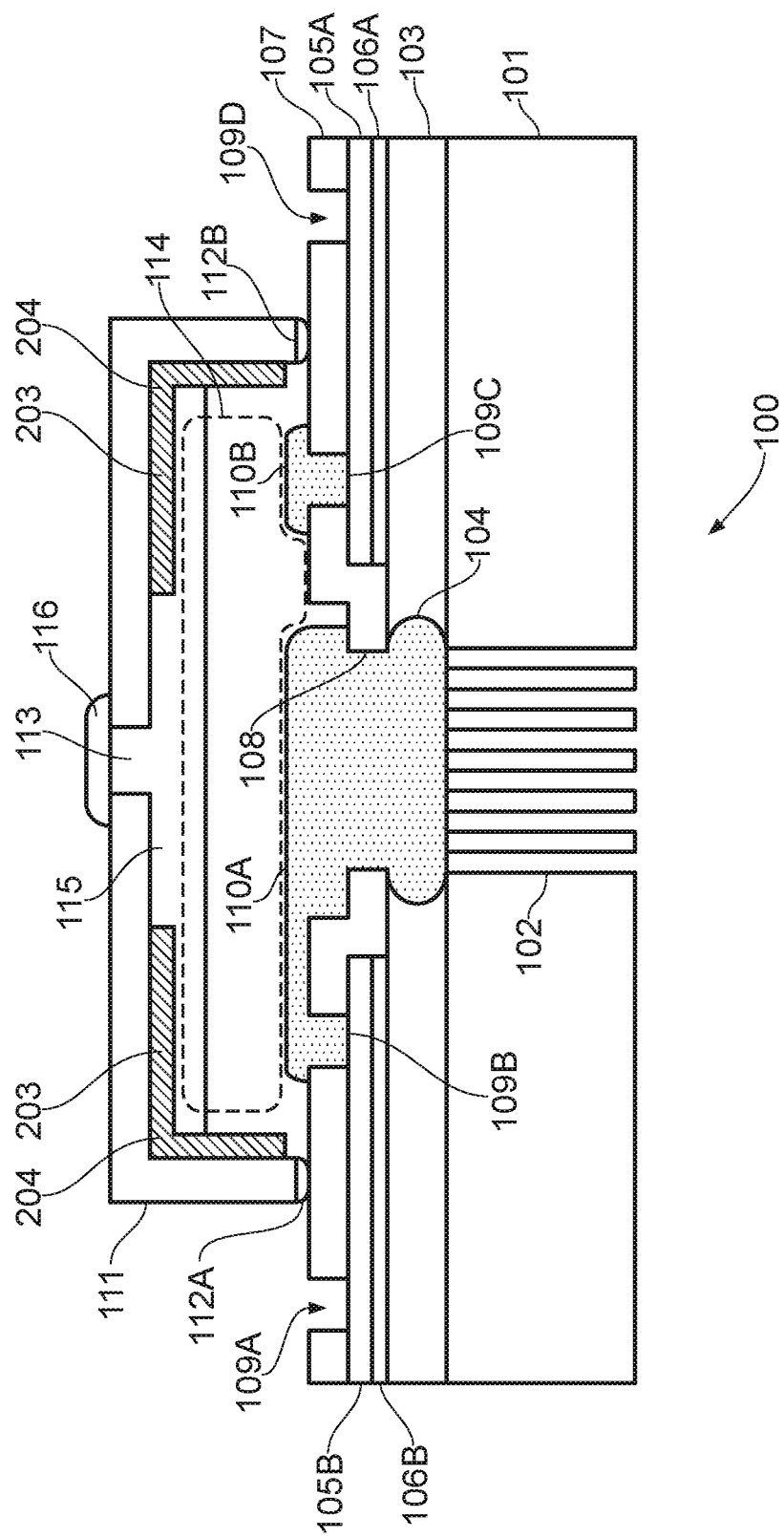
FIG. 5 is a cross-sectional view of an electrochemical sensor in accordance with a fifth example of the disclosure.

FIG. 5 shows a cross-section through an electrochemical sensor 100 formed on silicon using micromachining techniques in accordance with a fifth example of the disclosure. In this example, the hydrophobic layers 203, 204 of FIGS. 3 and 4 are combined. Together, hydrophobic layers 203, 204 repel electrolyte 114 from the side walls and the upper inner surface of the cap 111, thus encouraging the electrolyte to remain over the active region above the electrodes 110A, 110. The electrolyte 114 is shown in two positions, the first position (shown in solid lines) being how it would sit without the hydrophobic material and the second position (shown in dashed lines) being how it would sit with the hydrophobic materials applied to the inner surface of the cap 111. The hydrophobic layers 203, 204 are preferably deposited before the cap is adhered to the passivation layer 107 of the device.

Figure 6A:
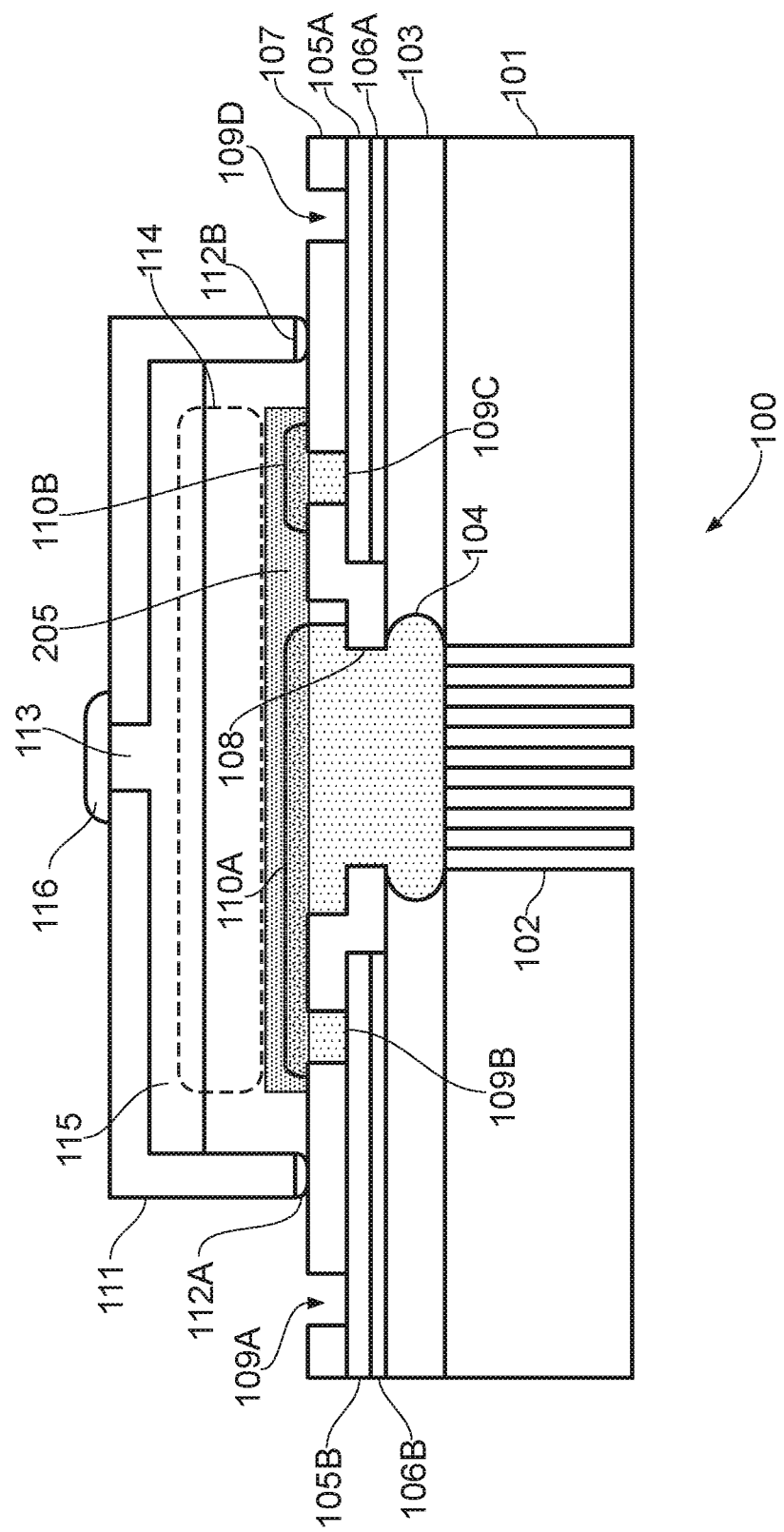
FIG. 6A is a cross-sectional view of an electrochemical sensor in accordance with a sixth example of the disclosure.

FIG. 6A shows a cross-section through an electrochemical sensor 100 formed on silicon using micromachining techniques in accordance with a sixth example of the disclosure. A hydrophilic material 205 is deposited over the electrodes and attracts the electrolyte 114 to remain over the electrodes 110A, 110B, keeping the electrodes wet. The electrolyte 114 is shown in two positions, the first position (shown in solid lines) being how it would sit without the hydrophilic material and the second position (shown in dashed lines) being how it would sit with the hydrophilic materials applied. Therefore, electrical contact between the electrodes 110A, 110B is maintained, and efficient operation of the device can be achieved.

Figure 6B:
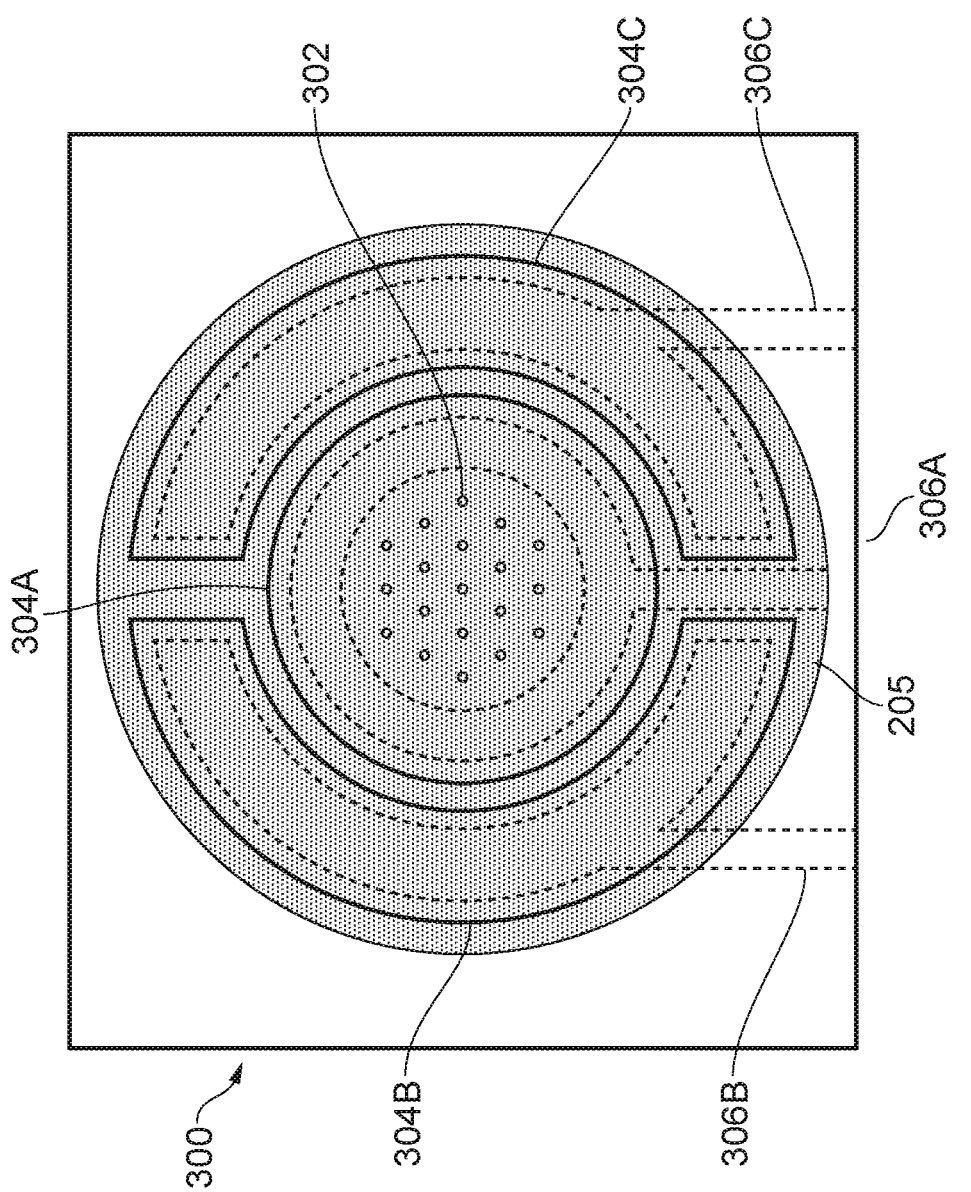
FIG. 6B is a plan view of an electrochemical sensor in accordance with another example of the disclosure.

FIG. 6B shows a plan view of an example sensor 300 with the cap 111 and the electrolyte 114 removed for clarity. In this example, the hydrophilic layer 205 is shown above the electrodes 304A, 3046, 304C in a circular shape such that it is arranged over the active region. The hydrophilic layer 205 attracts the electrolyte 114 and encourages the electrolyte 114 to sit above the circular hydrophilic layer 205. Since the electrolyte 114 is drawn to be positioned above the active region of the device, it does not tend to seep towards the edges of where the cap is sealed to the passivation layer.

Figure 7A:
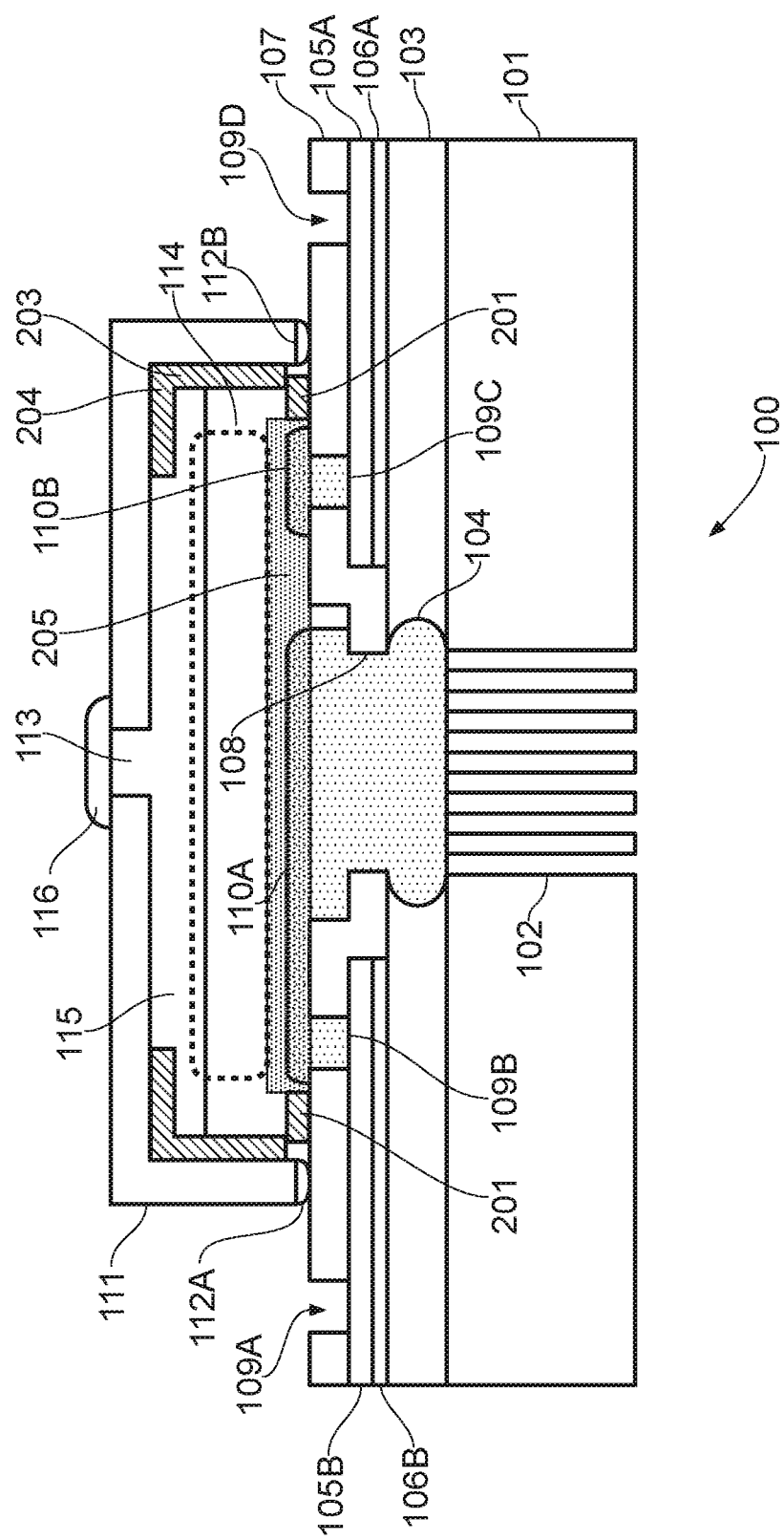
FIG. 7A is a cross-sectional view of an electrochemical sensor in accordance with a seventh example of the disclosure.

FIG. 7A shows a cross-section through an electrochemical sensor 100 formed on silicon using micromachining techniques in accordance with a seventh example of the disclosure. In this example, the hydrophobic layers 201, 203, 204, 205 of FIGS. 1A, 3, 4 and 6 are combined. A combination of hydrophobic and hydrophilic materials are coated on the inner surfaces of the electrolyte housing, i.e. the inner surfaces of the cap and upper surface of the passivation layer. In particular, the inner surfaces of the cap may be coated in hydrophobic materials 203, 204 in order to encourage the electrolyte to position itself on the active region of the electrochemical sensor. The upper surface of the passivation payer is coated in a combination of hydrophobic and hydrophilic materials, in a pattern shown in FIG. 76. As an alternative to a coating of hydrophobic or hydrophilic material, the surfaces of the housing itself may be conditioned so that they are hydrophobic or hydrophilic.

The electrolyte 114 in FIG. 7A is shown to be in two different positions, the first position (shown in solid lines) being how it would sit without the hydrophobic or hydrophilic materials and the second position (shown in dashed lines) being how it would sit with the hydrophobic or hydrophilic materials applied to the surfaces of the housing. As shown, the hydrophobic or hydrophilic materials cause the electrolyte 114 to recede away from the hydrophobic layers 203, 204 on the inner surfaces of the cap, away from the hydrophobic layer 201 on the passivation layer and towards the hydrophilic layer 205 on the passivation layer, i.e. the pattern of hydrophobic and hydrophilic layers encourages the electrolyte 114 to be positioned over the action region of the electrochemical sensor, over the electrodes 110A, 110B.

Figure 7B:
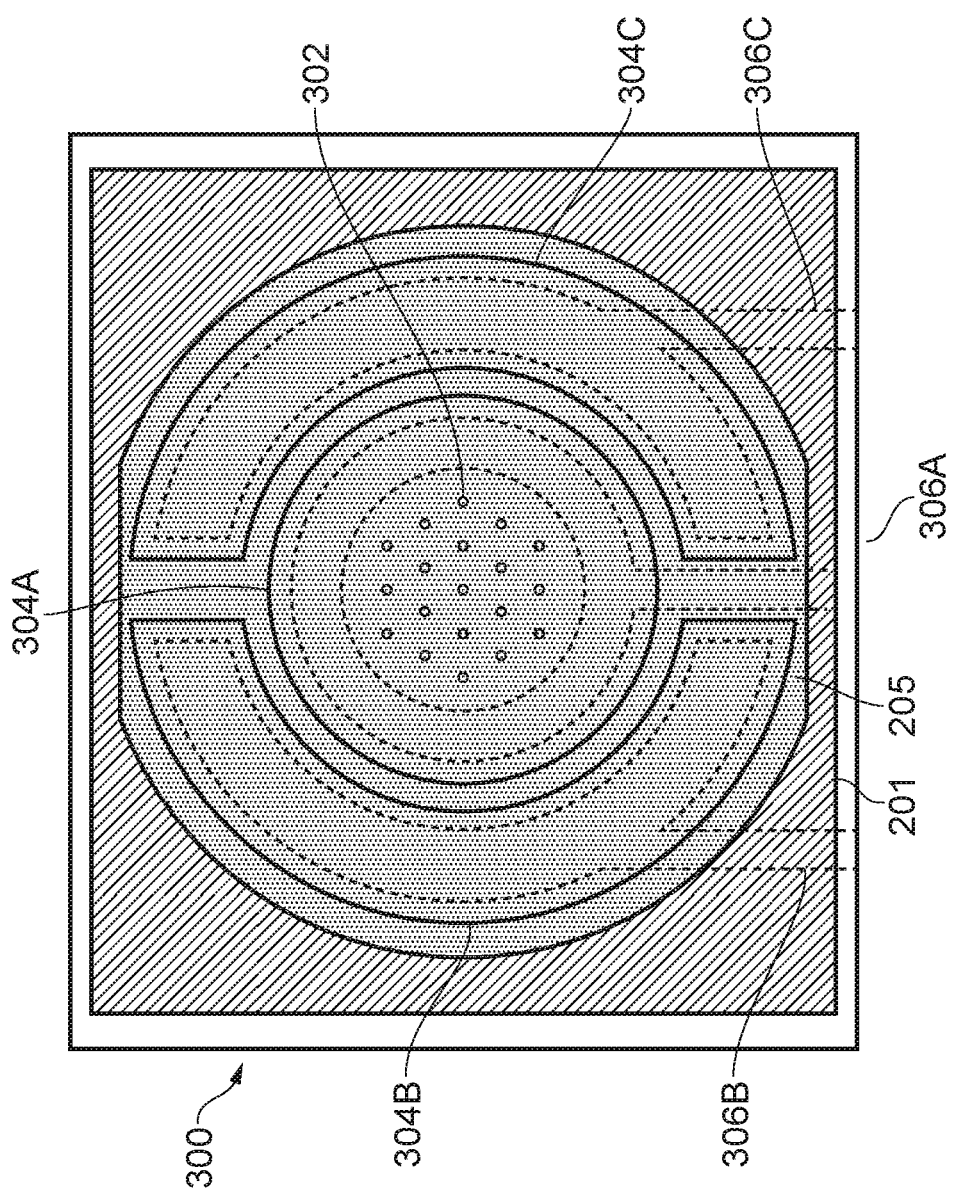
FIG. 7B is a plan view of an electrochemical sensor in accordance with another example of the disclosure.

FIG. 7B shows a plan view of an example sensor 300 with the cap 111 and the electrolyte 114 removed for clarity. Here, the hydrophobic layers 203, 204 on the inner surfaces of the cap are not shown since the cap 11 if removed. However, the hydrophobic layer 201 and the hydrophilic layer 205 on the passivation layer are shown. The electrolyte 114 sitting above the hydrophilic layer 205 is also shown.

A method of fabricating the electrochemical sensor 100 will now be described with reference to FIGS. 8A to 83.

Figure 8A:
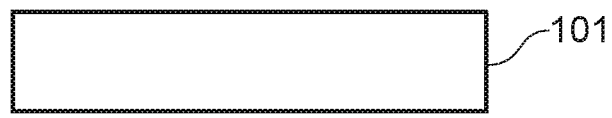
FIG. 8A schematically illustrates a substrate at an initial phase of a fabrication process for the electrochemical sensor shown in FIGS. 7A and 7B.

FIG. 8A shows the first step in the fabrication process. A silicon wafer is used as the silicon substrate 101. In the following, the process for forming one device will be described, however several hundred devices may be formed in parallel on the same wafer. The silicon substrate 101 is used for mechanical support, and could be substituted for another type of material, such as glass.

Figure 8B:
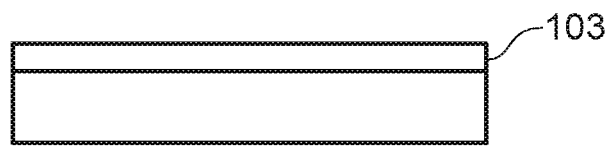
FIG. 8B shows the substrate after formation of an insulating layer.

An oxide insulating layer 103 is deposited on the wafer, as shown in FIG. 8B. The oxide layer serves as a "landing" oxide to stop the through wafer etch, and also serves as a layer to insulate the conductive tracks from the substrate to prevent shorting.

Figure 8C:
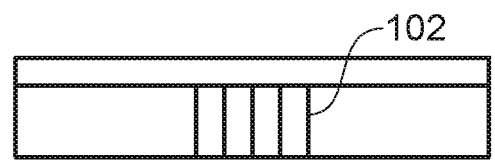
FIG. 8C shows the substrate after formation of microcapillaries.

The microcapillaries 102 are defined in the wafer by photolithography. The microcapillaries are etched through the wafer using an isotropic dry etch. They are etched from the backside of the wafer and stop at the oxide layer once the silicon wafer has been etched through, as shown in FIG. 8C.

Figure 8D:
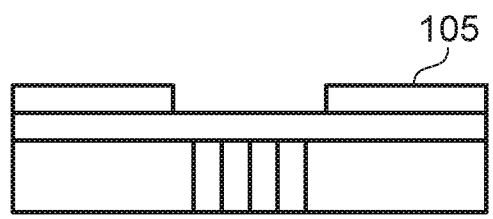
FIG. 8D shows the substrate after formation of a metal layer.

FIG. 8D shows formation of inert metal layers which form the conducting tracks 105. They are deposited on the insulation layer, on the front side of the wafer. An adhesive layer 106 is first deposited on the insulating layer 103, and is used to attach the metal layer to the insulating layer 103. The conductive tracks may be defined by photolithography and then etched. The thickness of the inert metal can be increased by electroplating in specific areas, as defined by photolithography.

Figure 8E:
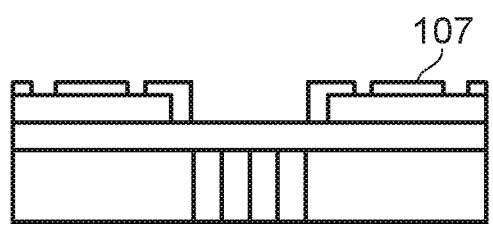
FIG. 8E shows the substrate after deposition and definition of the passivation layer.
Figure 8F:
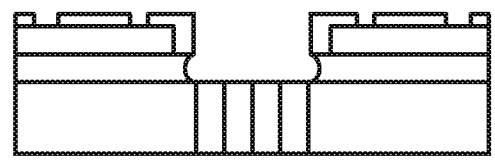
FIG. 8F shows the substrate after removal of a portion of the insulating layer.

FIG. 8E shows the sensor after deposition and definition of the passivation layer 107. The insulating oxide 103 on the front side of the wafer 101 is removed in the region of the microcapillaries 102 using a wet etch, as shown in FIG. 8F.

Figure 8G:
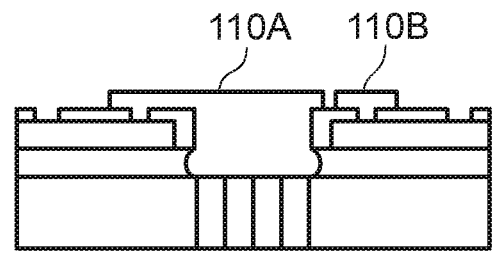
FIG. 8G shows the substrate after deposition of electrodes.

A porous electrode material is deposited on the wafer using screen printing, stencil printing, electroplating, or other lithographic deposition techniques to form electrodes 110A and 110B, as shown in FIG. 8G. Electrode 110A covers the microcapillaries 102, and connection is made to the conductive tracks.

Figure 8H:
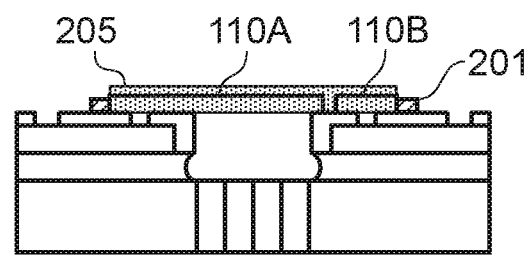
FIG. 8H shows the substrate after placement of the hydrophobic and hydrophilic materials on the substrate.

In FIG. 8H, a hydrophobic layer 201 and a hydrophilic layer 205 are deposited on the upper surface of the passivation layer in a pattern such that hydrophobic layer 201 surrounds hydrophilic layer 205. In an example where there is no passivation layer, the hydrophobic layer 201 and hydrophilic layer 202 may be deposited directly on the substrate.

Figure 8I:
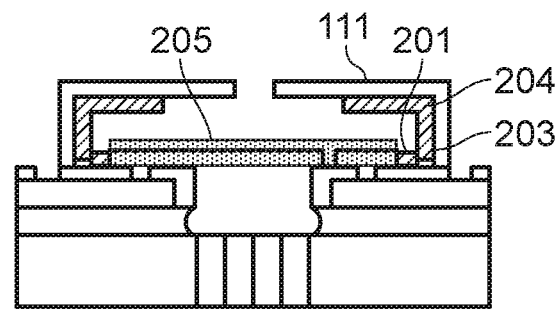
FIG. 8I shows the substrate after application of a cap having hydrophobic material.

The cap 111 is then placed over the sensor 100, as shown in FIG. 8I. As described above, the cap 111 may be made of plastic, ceramic, silicon or glass, amongst other materials. If the cap is made of plastic, it is typically prefabricated by injection molding, or mold casting if using PDMS, etc. The cap is coated on its inner surface with a hydrophobic layers 203, 204, which repel any electrolyte that is filled in the cavity. The recess and holes may be formed during the injection molding process. If the cap is made from glass, silicon or ceramic, the cap would typically be fabricated using wafer level processing techniques. For glass or ceramic caps, cavities can be made in the cap by firstly using photolithography to pattern the cap cavity. Then one of, or a combination of, wet etching, dry etching, sand blasting and laser drilling may be used to create the cavities in the cap. For silicon caps, cavities can be made in the cap by firstly using photolithography to pattern the cap cavity. Then one of, or a combination of, wet etching, dry etching, sand blasting, and laser drilling may be used to create the cavities in the cap.

Figure 8J:
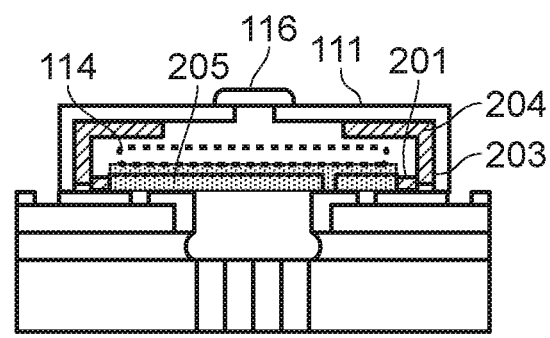
FIG. 8J shows the substrate after insertion of an electrolyte and sealing of the cap.

The cap 111 is attached to the wafer through wafer bonding (wafer processing) or through placement with epoxy/adhesive on the sensor wafer (single cap placement process). Alternatively, the cap 111 may be attached by other means such as ultrasonics. The electrolyte 114 is dispensed through the cap hole 113 and the hole is sealed, as shown in FIG. 8J. As noted above, the cap 111 may have more than one hole.

Figure 9:
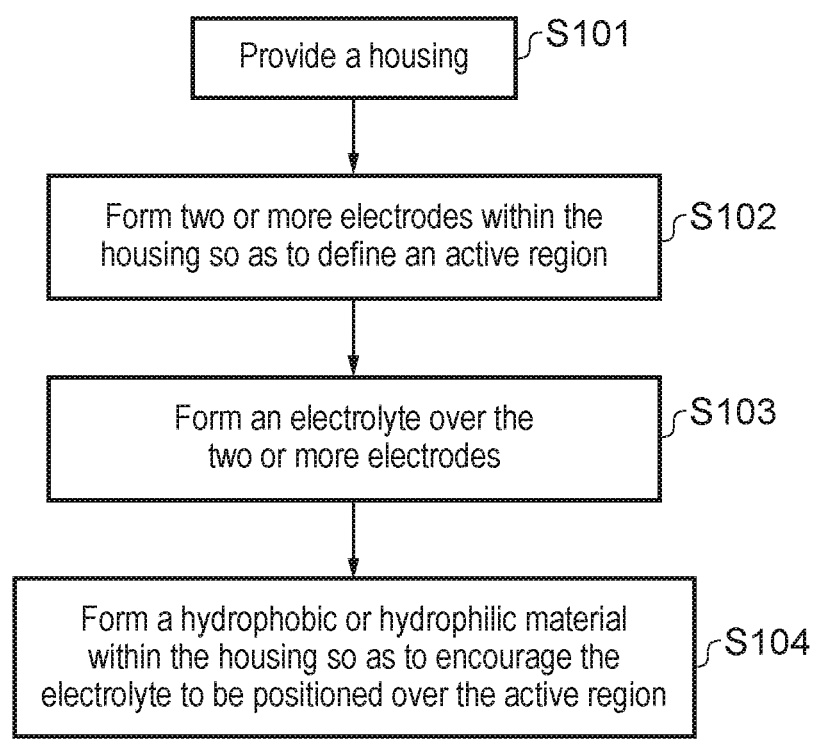
FIG. 9 is a flow diagram showing the steps in a method in accordance with another example of the disclosure.

FIG. 9 is a flow diagram illustrating various steps in a method of manufacturing an electrochemical sensor according to an example of the disclosure. The method initially involves, at step S101, providing a housing. Then, at step S102, two or more electrodes are formed within the housing so as to define an active region. Then, at step S103, an electrolyte is formed over the two or more electrodes. Finally, at step S104, a hydrophobic or hydrophilic material is formed within the housing so as to encourage the electrolyte to be positioned over the active region.

Figure 10:
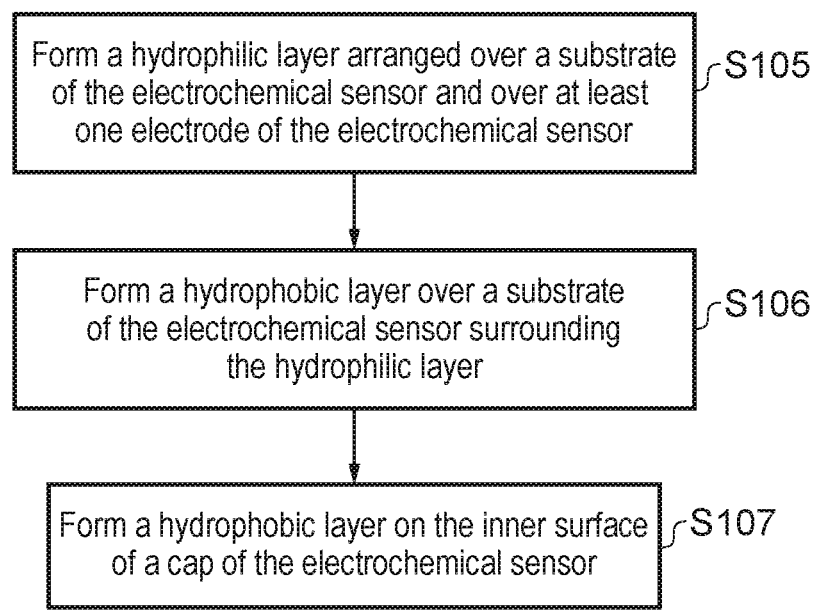
FIG. 10 is a flow diagram showing options for additional steps in a method in accordance with a further example of the disclosure.

FIG. 10 is a flow diagrams illustrating various options for additional steps in the method, in particular, for creating the hydrophobic or hydrophilic material. At step S105, a hydrophilic layer is formed and arranged over a substrate of the electrochemical sensor and over at least one electrode of the electrochemical sensor. At step, S106, a hydrophobic layer is formed over a substrate of the electrochemical sensor surrounding the hydrophilic layer. At step S107, a hydrophobic layer is formed on the inner surface of a cap of the electrochemical sensor. The hydrophobic layer on the inner surface of the cap may be on the side walls and/or on the top surface, and is preferably deposited as a coating on the inner surface of the cap before the cap is attached to a substrate or passivation layer of the electrochemical sensor. It will be appreciated that steps S105, S106 and S107 may be performed in any order.

In each of the above-mentioned examples of the disclosure, the electrochemical sensors are shown in a horizontal orientation. It will be appreciated that, in use, the electrochemical sensors may be arranged in a non-horizontal orientation, for example, in a vertical orientation or at an angle to the horizontal orientation shown in the Figures. In such cases, without the arrangement of hydrophobic and/or hydrophilic materials, the two or more electrodes of the electrochemical sensor are susceptible to being totally or partially "dry" of electrolyte. However, with the arrangement of hydrophobic and/or hydrophilic materials, the electrolyte is encourage to be positioned over the active region/at least one electrode so that the electrodes are less likely to "dry out". The above description relates to particularly preferred aspects of the disclosure, but it will be appreciated that other implementations are possible. Variations and modifications will be apparent to the skilled person, such as equivalent and other features which are already known and which may be used instead of, or in addition to, features described herein. Features that are described in the context of separate aspects or examples may be provided in combination in a single aspect or example. Conversely, features which are described in the context of a single aspect or example may also be provided separately or in any suitable sub-combination.

It will be appreciated that each of the above examples provides one example of a pattern of hydrophobic and hydrophilic materials. Other patterns could be used that achieve the same result of causing the electrolyte to move towards the active region. For example, a ring of hydrophilic material could be provided around and adjacent to the electrodes, with hydrophobic material surrounding the hydrophilic material. Furthermore, in some examples, only hydrophobic or only hydrophilic materials may be used.

It will also be appreciated that each of the above examples relates to examples where the electrolyte is an aqueous hydrophilic electrolyte. As mentioned in the Summary of the Disclosure, in some claimed examples, the electrolyte is a non-aqueous hydrophobic electrolyte. In these examples, the hydrophobic/hydrophilic materials of the Figures may be "swapped", i.e. the hydrophilic materials would be arranged on the cap walls/corners and around the electrodes to keep the electrolyte in position over the active region.

In this disclosure, reference to hydrophobic materials includes both hydrophobic and super-hydrophobic materials. Furthermore, reference to hydrophilic materials includes both hydrophilic and super-hydrophilic materials. In addition, reference to hydrophobic or hydrophilic materials may include coatings or surfaces which have been treated in order to provide a material with hydrophobic or hydrophilic properties at its surface.

The present disclosure had been described in the context of an electrochemical sensor. It will be appreciated that the use of hydrophobic and hydrophilic materials in the manner described above may be utilised with other types of devices. For example, devices which share the problems noted above in connection with electrochemical sensors may also utilise the above-described techniques. For example, devices which are required to keep water-based substances in a particular location on the device may benefit from patterning of hydrophobic and hydrophilic materials. Furthermore, devices whose operation may be impacted by movement of water into, or out of the device, though fluid transmission pathways may also benefit from the use of hydrophobic materials or surfaces.

The invention claimed is:

1. An electrochemical sensor, comprising:
a housing, wherein the housing comprises a substrate, having a plurality of layers, and a cap;
two or more electrodes formed within the housing over a first portion of the substrate and defining an active region;
an electrolyte formed within the housing; and
a hydrophobic material arranged within the housing so as to encourage the electrolyte to be positioned over the active region, wherein the hydrophobic material comprises a hydrophobic layer arranged over a second portion of the substrate surrounding the two or more electrodes.

2. An electrochemical sensor according to claim 1, further comprising a hydrophilic material arranged within the housing.

3. An electrochemical sensor according to claim 2, wherein the hydrophilic material comprises a hydrophilic layer arranged at least partially over, or adjacent to, the at least two electrodes.

4. An electrochemical sensor according to claim 3, wherein the two or more electrodes are positioned towards the centre of the substrate, the hydrophobic layer comprises an opening aligned with the electrodes, and the hydrophilic layer is arranged within the opening.

5. An electrochemical sensor according to claim 4, wherein at least one of the at least two electrodes is ring shaped, the hydrophilic layer is ring shaped, and the ring shaped hydrophilic layer and the ring shaped electrode are coterminous.

6. An electrochemical sensor according to claim 2, wherein the hydrophilic material comprises two ring shaped hydrophilic layers arranged concentrically.

7. An electrochemical sensor according to claim 6, wherein the hydrophilic layers are arranged over an area of the substrate in areas adjacent the two or more electrodes.

8. An electrochemical sensor according to claim 2, wherein the hydrophobic material comprises a hydrophobic layer arranged to surround a hydrophilic material comprising a hydrophilic layer.

9. An electrochemical sensor according to claim 8, wherein the hydrophobic layer and the hydrophilic layer are coterminous.

10. An electrochemical sensor according to claim 2, wherein the hydrophilic material comprises a hydrophobic layer arranged on the inner surface of a cap or over a substrate of the electrochemical sensor surrounding the two or more electrodes, and/or the hydrophobic material comprises a hydrophobic layer arranged over at least one electrode of the electrochemical sensor.

11. An electrochemical sensor according to claim 10, wherein the electrolyte is a non-aqueous hydrophobic electrolyte, and wherein the at least one of a hydrophobic or a hydrophilic material is patterned so as to cause the electrolyte to move away from the hydrophilic material and/or towards the hydrophobic material.

12. An electrochemical sensor according to claim 2, wherein the hydrophobic material comprises at least one of polytetrafluoroethylene, PTFE, and SU8, and the hydrophilic material comprises at least one of silicon dioxide and porous hydrophilic polymers.

13. An electrochemical sensor according to claim 1, wherein the two or more electrodes are positioned towards the centre of the substrate, and the hydrophobic layer comprises an opening aligned with the electrodes.

14. An electrochemical sensor according to claim 13, wherein the two or more electrodes are circular or ring shaped.

15. An electrochemical sensor according to claim 1, wherein the hydrophobic material comprises a hydrophobic layer arranged on the inner surface of a cap of the electrochemical sensor so as to repel electrolyte away from the inner surface of the cap.

16. An electrochemical sensor according to claim 1, comprising a hydrophobic layer and a hydrophilic layer, the hydrophilic layer being arranged in closer proximity to the at least two electrodes than the hydrophobic layer.

17. An electrochemical sensor according to claim 1, wherein the electrolyte is an aqueous hydrophilic electrolyte, and wherein the hydrophobic material is patterned so as to cause the electrolyte to move away from the hydrophobic material.

18. A sensor package, comprising:
   a substrate;
   two or more electrodes formed over the substrate;
   a cap;
   an electrolyte, wherein the electrolyte is held within the gas sensor package, in use, in a space encapsulated by the substrate and the cap, and wherein the electrolyte is held over an active sensing region of the electrodes by at least a one of a hydrophobic or a hydrophilic material; and
   a hydrophobic material, including a hydrophobic layer arranged on the inner surface of the cap of the electrochemical sensor so as to repel electrolyte away from the inner surface of the cap.

19. A method of manufacturing an electrochemical sensor, the method comprising:
   providing a housing;
   forming two or more electrodes within the housing so as to define an active region;
   forming an electrolyte over the two or more electrodes; and
   forming a hydrophobic material within the housing so as to encourage the electrolyte to be positioned over the active region; and
   forming a hydrophobic layer arranged on the inner surface of a cap of the electrochemical sensor so as to repel electrolyte away from the inner surface of the cap.

20. A method according to claim 19, wherein the step of forming the at least one of a hydrophobic or a hydrophilic material comprises one or more of the following steps:
   forming a hydrophobic layer and/or a hydrophilic layer on the inner surface of a cap of the electrochemical sensor;
   forming a hydrophobic layer and/or a hydrophilic layer over a substrate of the electrochemical sensor surrounding the two or more electrodes;
   forming a hydrophobic layer and/or a hydrophilic layer arranged over at least one electrode of the electrochemical sensor;
   forming a hydrophobic layer surrounding a hydrophilic layer or a hydrophilic layer surrounding a hydrophobic layer;
   patterning the at least one of a hydrophobic or a hydrophilic material so as to cause the electrolyte to move away from the hydrophobic material and/or towards the hydrophilic material; and
   patterning the at least one of a hydrophobic or a hydrophilic material so as to cause the electrolyte to move away from the hydrophilic material and/or towards the hydrophobic material.

\* \* \* \* \*